United States Patent
Quak et al.

[11] Patent Number: 6,052,783
[45] Date of Patent: Apr. 18, 2000

[54] METHOD OF LOADING COMMANDS IN THE SECURITY MODULE OF A TERMINAL

[75] Inventors: Jacobus T. W. Quak, Utrecht; Frank Muller, Delft; Willem Rombaut, The Hague, all of Netherlands

[73] Assignee: Koninklijke KPN N.V., Groningen, Netherlands

[21] Appl. No.: 08/912,920

[22] Filed: Aug. 15, 1997

[30] Foreign Application Priority Data

Aug. 15, 1996 [EP] European Pat. Off. .............. 96202293

[51] Int. Cl.[7] ...................................................... G09C 1/06
[52] U.S. Cl. .......................... 713/201; 713/161; 380/257
[58] Field of Search .................................. 713/161, 201, 713/170, 200; 380/257

[56] References Cited

U.S. PATENT DOCUMENTS

| | | |
|---|---|---|
| 4,017,839 | 4/1977 | Calle et al. . |
| 4,672,572 | 6/1987 | Alsberg ...................................... 380/23 |
| 4,742,215 | 5/1988 | Daughters et al. ...................... 235/487 |
| 4,777,355 | 10/1988 | Takahira . |
| 4,972,478 | 11/1990 | Dabbish . |
| 5,495,571 | 2/1996 | Corrie, Jr. et al. . |
| 5,572,004 | 11/1996 | Raimann . |
| 5,856,659 | 1/1999 | Drupsteen et al. . |

FOREIGN PATENT DOCUMENTS

| | | |
|---|---|---|
| 0 368 752 | 5/1990 | European Pat. Off. . |
| 2 657 445 | 7/1991 | European Pat. Off. . |

*Primary Examiner*—Thomas R. Peeso
*Attorney, Agent, or Firm*—Oblon, Spivak, McClelland, Maier & Neustadt, P.C.

[57] ABSTRACT

A method of loading commands (C1, C2, ...) in a security module (2) of a terminal (1) is disclosed. The method comprises the steps of: a station (4) transferring the commands (C1–Cn) to the terminal (1), the terminal (1) transferring the commands (C1–Cn) to the security module (2), the security module (2) executing the commands (C1–Cn), the terminal (1) selectively recording actual results (R1'–Rm') of the executed commands (C1–Cn), and the transfer means (3) transferring the results (R1'–Rm') back to the station (4). The commands may have associated expected results (e.g. R1), which the terminal (1) may compare with the actual results (e.g. R1'). This allows both a flexible loading of data in the security module (2) by means of commands and a remote check of the functioning of the security module.

10 Claims, 3 Drawing Sheets

METHOD OF LOADING COMMANDS IN THE SECURITY MODULE OF A TERMINAL

BACKGROUND OF THE INVENTION

The present invention relates to a method of loading commands in the security module of a terminal. More specifically, the present invention relates to the controlled loading of data in the security module of a smart card operated terminal by means of the execution of commands.

Terminals, such as vending machines or public telephones, often comprise a security module for securely storing usage data. Such payment data is e.g. the number of times the terminal has been used, the amount of money spent by consumers at the particular terminal, or the number of telephone metering pulses the (telephone) terminal has collected. A security module, which is usually mechanically and/or electronically protected against abuse, comprises electronic memory means (such as counters and EEPROM) for registering payment data and for storing keys. A security module may further comprise processing means for processing data, such as usage data. Such processing means normally comprise a microprocessor running programs consisting of commands stored in the security module. The processing often comprises the cryptographic protection of the usage data in order to prevent fraud. An example of a security module and its use is disclosed in U.S. Pat. No. 5,572,004 (Raimann), which patent is incorporated by reference in this text.

It is often necessary to update the data stored in a security module, e.g. for adding new functions or modifying existing functions. Data may be added or altered using commands, the execution of which effects the desired addition or alteration. However, the functioning of the additions and alterations needs to be verified. This is especially true since security modules often store monetary data or their equivalents.

Thus the need arises to be able to load such new data into the security module and to verify its effects, i.e. the proper functioning of the modifications brought about by that data. As in practice it will be necessary to effect changes in security modules in many different locations, verifying the functioning of those security modules constitutes a problem. The Prior Art does not offer a solution for this problem.

U.S. Pat. No. 4,972,478 discloses a cryptographic circuit connected with external programming equipment which may perform an execution test to verify that the cryptographic circuit accurately performs its cipher algorithm. How this execution test is performed, and which results are transferred to the external programming equipment, is not disclosed. Said patent does not deal with a smart card operated terminal.

U.S. Pat. No. 5,495,571 discloses a method for parametric testing of a function programming interface. A testing plan invokes the function with different parameter values and it is tested whether the function returns appropriate error codes. Said patent does not deal with the controlled loading of data and commands. Also, said patent does not deal with a smart card operated terminal.

SUMMARY OF THE INVENTION

It is an object of the invention to overcome the above-mentioned and other disadvantages of the prior art and to provide a method which allows data to be loaded into the security module of a terminal and to verify the proper functioning of the commands using that data. It is a further object of the invention to provide a method which allows the remote function check of a security module. It is another object of the present invention to provide a method which allows the terminal to be transparant with respect to the commands.

Accordingly, the present invention provides a method of loading commands in a security module of a terminal, the method comprising the steps of:

a station transferring the commands to the terminal via a transfer means, the terminal transferring the commands to the security module, the security module executing the commands, the terminal recording results of the executed commands, and the transfer means transferring the results to the station.

The station may be a remote terminal management agency. The transfer means may e.g. be a telephone line or a (special purpose) card which is inserted into the terminal.

By recording the results of the executed commands, it is possible to remotely check the proper functioning of the security module. Preferably, the commands are transferred to the terminal as part of a script file, the terminal extracting the respective commands from the script file and passing them to the security module. Advantageously the script file contains information allowing the selective recording of results, i.e. allowing the results of some commands to be registered, while the results of other commands are not registered. This makes it possible to control the loading of certain commands into the security module by requiring the proper execution of the previous command, while allowing other commands (e.g. commands of which the results are unpredictable) to be loaded without imposing a restriction.

As the terminal substantially only transfers the commands to the secure module, the terminal is effectively transparent with respect to the commands. This makes the terminal substantially independent of the particular security module used.

BRIEF DESCRIPTION OF THE DRAWINGS

The invention will further be explained with reference to the accompanying drawings, in which.

EXEMPLARY EMBODIMENTS

Figures 1, 2:
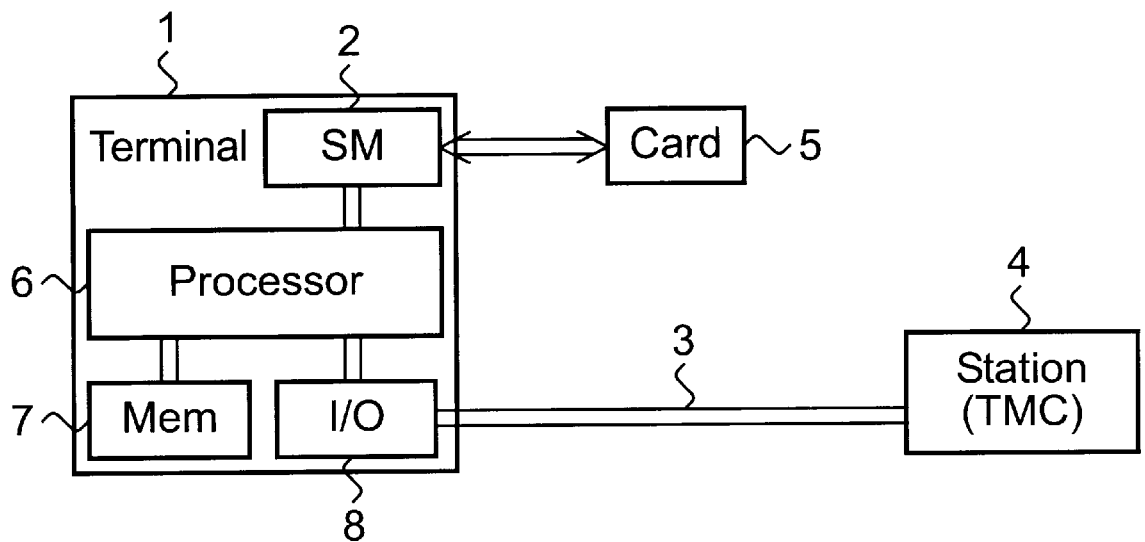
FIG. 1 schematically shows a terminal in which the method of the present invention may be used, FIG. 2 schematically shows an example of the structure of a script file containing commands to be loaded.

The embodiment shown schematically and by way of example in FIG. 1 comprises a terminal 1, connected via a telecommunications link 3 with a station (terminal management center) 4. As will be explained below, the station 4 may serve both to make script files and to verify the functioning of the terminal 1. The terminal 1 comprises at least one security module 2 which during normal use of the terminal 1 communicates with a smart card 5. The terminal 1 further comprises a processor 6 connected with an associated memory (RAM and/or ROM) 7, an I/O (input/output) unit 8, and the security module 2. The I/O unit is connected with the telecommunications link 3, which is e.g. a subscriber line of a public telephone network (PSTN) or a link of a computer network.

The security module 2 may comprise a processor, a memory, an I/O unit and an associated card reader/writer (not shown) for interfacing with the IC card (smart card) 5. A security module normally is a physically and/or cryptographically protected unit for securely storing data relating to the use of the terminal, e.g. transaction data such as monetary balances. Although in this text a security module is mentioned throughout, it will be understood that the present invention is also applicable to terminals in which the security module is replaced by another unit having processing and storage means.

In order to load commands into the security module 2 and execute them while having the possibility to check their proper functioning, as provided by the present invention, a script file is made in the station 4. The script file, which will further be explained with reference to FIG. 2, contains the commands to be loaded and executed, thus effecting a data transfer to and/or from the security module 2. Preferably, the terminal 1 verifies the origin of the commands, i.e. the terminal checks whether the commands were produced by or at least sent by the station 4. This verification, which serves to prevent fraudulent modifications of the contents of the security module, may be effected by comparing a received MAC (message authentication code) with a MAC calculated by the terminal. Such verification procedures are well known in the art.

As shown in FIG. 2, a script file 10 may contain a header and a number of records, each record comprising a type field Ti (e.g. T1), a command field Ci (e.g. C1) and a result field Ri (e.g. R1). The result field Ri may be empty, as will be explained later. A command may contain data to be written in the memory of the security module, such as a key for encrypting usage data. However, a command may also contain an instruction to be executed by the security module 2. A suitable format of the commands Ci (i ranges from 1 to 4 in FIG. 2) is e.g. disclosed in the ISO7816-4 standard.

The type field Ti allows different types of commands to be distinguished. In the method of the present invention, three different types of commands can be distinguished, resulting in three different types of command handling by the terminal.

A first type of command has an associated expected result or response R. This type of command is preferably loaded one by one in the security module, the terminal comparing the actual result Ri' with the expected result Ri and stopping the loading if a discrepancy, i.e. a mismatch between Ri and Ri' occurs. With this type of command it is possible to perform a controlled loading of the security module and to check the proper functioning of the security module while loading.

A second type of command is not accompanied by an expected response (i.e. the response field Ri may be empty). However, the terminal preferably registers the actual responses. This type of command allows a test of the security module to be performed, especially in the case where an unknown type of security module (of which the responses are not completely known in advance) is used. The results may be entered in a log file which can be collected later. Thus an off-line processing of the commands is possible.

A third type of command is loaded into the security module and executed without taking the result into account. That is, the result of this type of command is not registered by the terminal.

It will be understood that the above-mentioned results of the commands may comprise memory contents, a status (e.g. indicating a failed write operation), and/or a smart card command. The said commands may thus effect a data transfer to and/or from the security module.

As explained above, the terminal extracts the commands from the script file and passes them to the security module. Although the terminal is passive with respect to the commands, it is active with respect to the script file in that it extracts the commands from the file and derives its mode of operation (check result/no check) from the type fields contained in the script file. The script file thus comprises information which influences the functioning of the terminal with respect to the script file and the commands derived from it.

The script file may comprise only a single command. However, the size of the script file may vary and is limited only by the amount of memory available in the terminal. It can also be envisaged that the script file contains commands in a compressed and/or cryptographically protected form.

Figure 3:
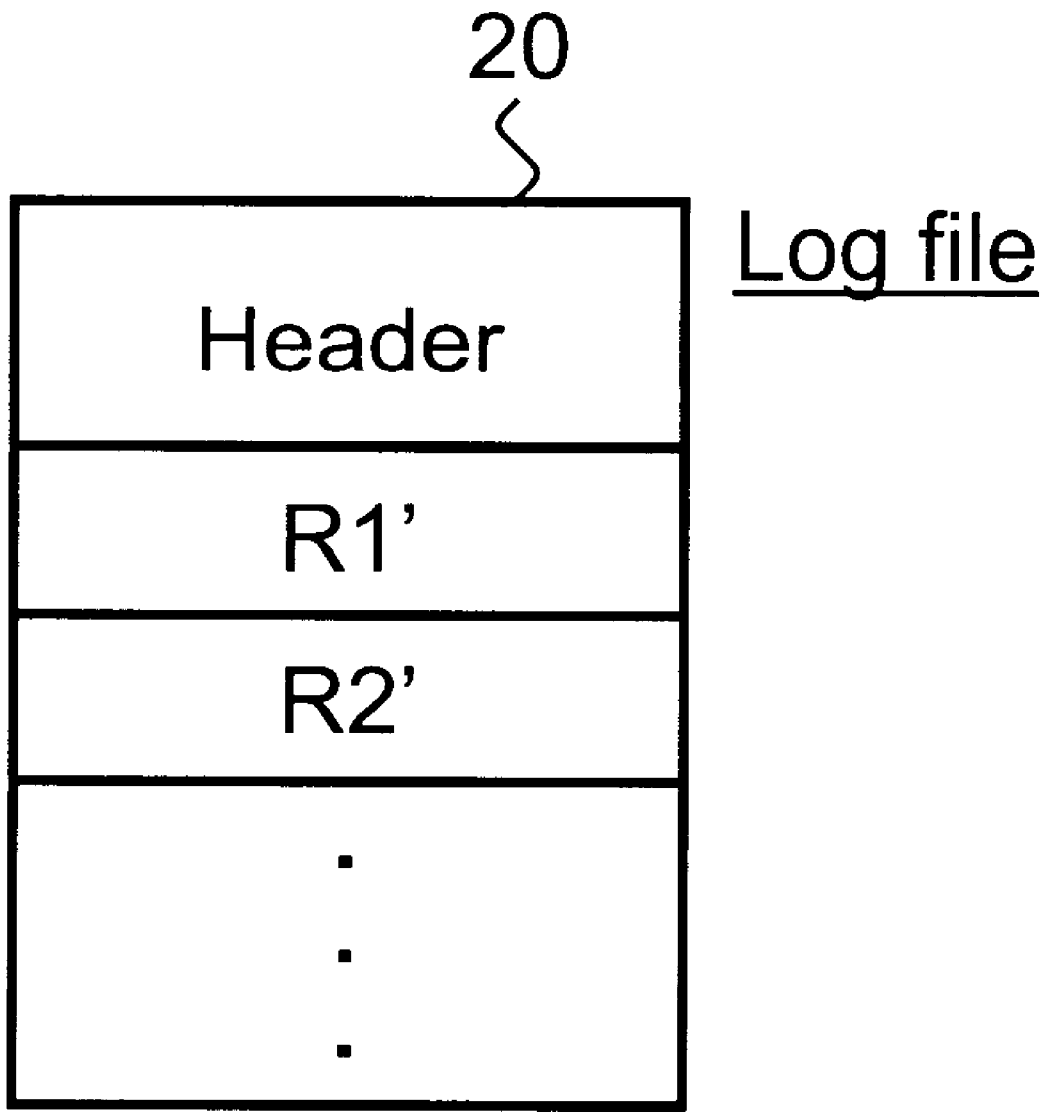
FIG. 3 schematically shows an example of the structure of a log file containing results of commands.

In FIG. 3, an example of a so-called log file is shown. The file 20 comprises a file header and a number of data fields. In these data fields, the actual results of commands are stored during or after the processing (logging of the results). The data fields shown contain a first result R1' of a first executed command and a second result R2' of a second executed command. In the station 4 (as shown in FIG. 1), or in another device, these actual results Ri' may be compared with expected results Ri or may be processed in another way.

Figure 4:
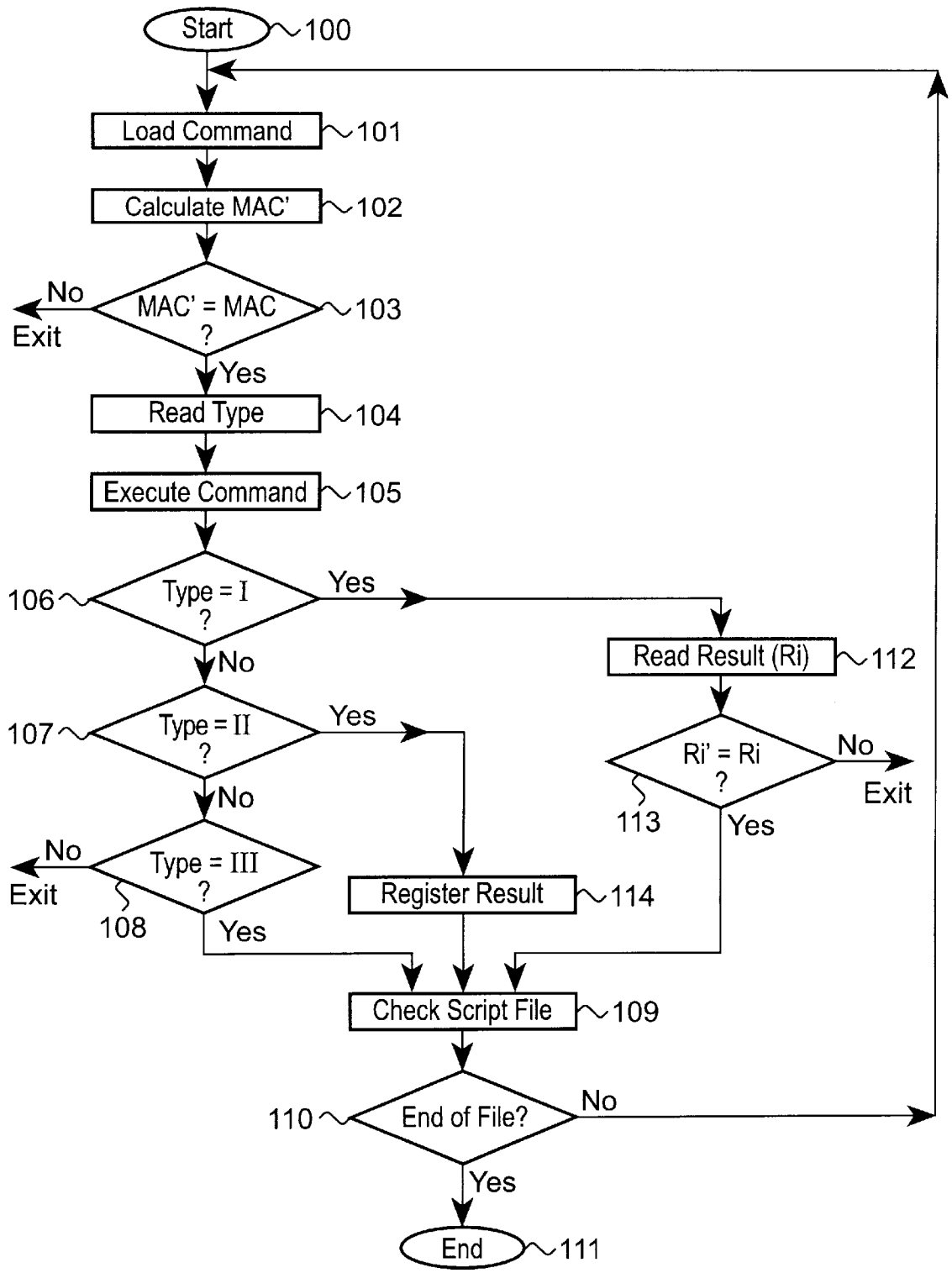
FIG. 4 shows a flow diagram representing the processing of commands in a security module according to the present invention.

The flow diagram of FIG. 4 represents by way of example an embodiment of the method of the present invention. The diagram comprises an initialization step 100, denoted "Start", in which a command or a script file containing commands is transferred from the station 4 to the security module 2 of the terminal 1 (cf. FIG. 1).

In step 101, the command is loaded into the processor of the security module 2, e.g. by extracting the command from the script file. In step 102, the security module re-calculates the message authentication code of the command, resulting in an actual (recalculated) code MAC'. In step 103, this actual code MAC' is compared with the received code MAC. If the codes are equal, the received code MAC is considered authentic and the procedure continues with step 104. If the codes are not equal, the procedure exits via an appropriate exit routine (not shown), which may generate an error message.

In step 104, the type of the command is determined by reading the type (Ti) of the command (cf. FIG. 2) and is temporarily stored. Then, in step 105, the command (Ci) is executed by the security module and the results (Ri') are temporarily stored.

In steps 106 through 108 the security module determines if and how the results are going to be processed.

If, in step 106, the type equals I (first type), the procedure continues with step 112, in which the expected result (Ri) is read from the script file (cf. FIG. 2) to be compared with the actual result (Ri') in step 113. If, in step 113, the results are equal, the procedure continues with step 109, else the procedure exits (incorrect result). If the type does not equal I, the procedure continues with step 107.

If, in step 107, the type equals II (second type), the procedure continues with step 114 in which the actual result (Ri') is registered, e.g in the log file of FIG. 3. If the type does not equal II, the procedure continues with step 108.

If, in step 108, the type equals III (third type), the procedure continues with step 109. If the type does not equal III, the procedure exits (incorrect type).

In steps 109 and 110 the security module checks whether the end of the script file has been reached. If the end of the file is detected in step 110, the procedure terminates in step 111, e.g. by closing and transmitting the log file (if appropriate). If the end of the script file has not yet been reached, the procedure continues with step 101, in which the next command is loaded.

By processing the results of the commands in dependance of the type of the individual commands, it is possible to selectively process the commands of a single script file.

It will be understood that the procedure set out above is given by way of example only. Thus, the checking of the message authentication code, or of any other data protecting code, could be carried out by performing an inverse calculation of the code instead of a re-calculation as set out in steps 102 and 103. The results of executed commands are preferably registered by storing these in the memory of the security module. Alternatively, the results may be stored in the memory (7) of the terminal. A log file may be stored in the terminal memory (7) before transmitting the file to the station (4) or transferring the file to a smart card (5). A script file may also be stored in the terminal memory (7), each command being loaded into the security module in step 101 of the above procedure.

As described above, the method of the present invention allows both a flexible loading of data in the security module and a remote check of the functioning of the security module.

It will be understood by those skilled in the art that the embodiments described above are given by way of example only and that many modifications and additions are possible without departing from the scope of the present invention.

What is claimed is:

1. Method of loading commands (C1, C2, . . . ) in a security module (2) of a terminal (1), the method comprising the steps of:

a station (4) transferring the commands (C1–Cn) to the terminal (1) via a transfer means (3), the terminal (1) transferring the commands (C1–Cn) to the security module (2), the security module (2) executing the commands (C1–Cn), the terminal (1) recording results (R1'–Rm') of the executed commands (C1–Cn), and the transfer means (3) transferring the results (R1'–Rm') to the station (4).

2. Method according to claim 1, wherein the commands are transferred to the terminal (1) as part of a script file (10), the terminal (1) extracting the respective commands (C1–Cn) from the script file (10) and passing them to the security module (2).

3. Method according to claim 2, wherein the script file (10) contains information (T1–Tn) allowing the selective recording of results (R1'–Rm').

4. Method according to claim 2, wherein the script file (10) is made in the verification station (4).

5. Method according to claim 1, wherein the script file (10) contains the expected result (e.g. R3) of each command (e.g. C3).

6. Method according to claim 5, wherein each command (e.g. C1) is transferred to the security module (2) individually, the terminal (1) comparing the expected result (e.g. R3) with the actual result (e.g. R3') and stopping the transferring if a mismatch is detected.

7. Method according to claim 1, wherein the transfer means (3) is a telecommunications link, such as a telephone connection.

8. Method according to claim 1, wherein the transfer means (3) comprises a card to be inserted in the terminal (1).

9. Method according to claim 1, wherein the terminal (1), before transferring the commands (C1–Cn) to the security module (2), verifies whether the commands originate from the station (4).

10. Terminal (1) comprising a processor (6), a memory (I/O) and a security module (2), the security module (2) being arranged for selectively registering results (R1–Rm) of executed commands (C1–Cn).

* * * * *